Feb. 1, 1955
B. GARNI
2,700,810
APPARATUS FOR MANUFACTURING FACED CONCRETE BLOCKS
Filed Feb. 10, 1948
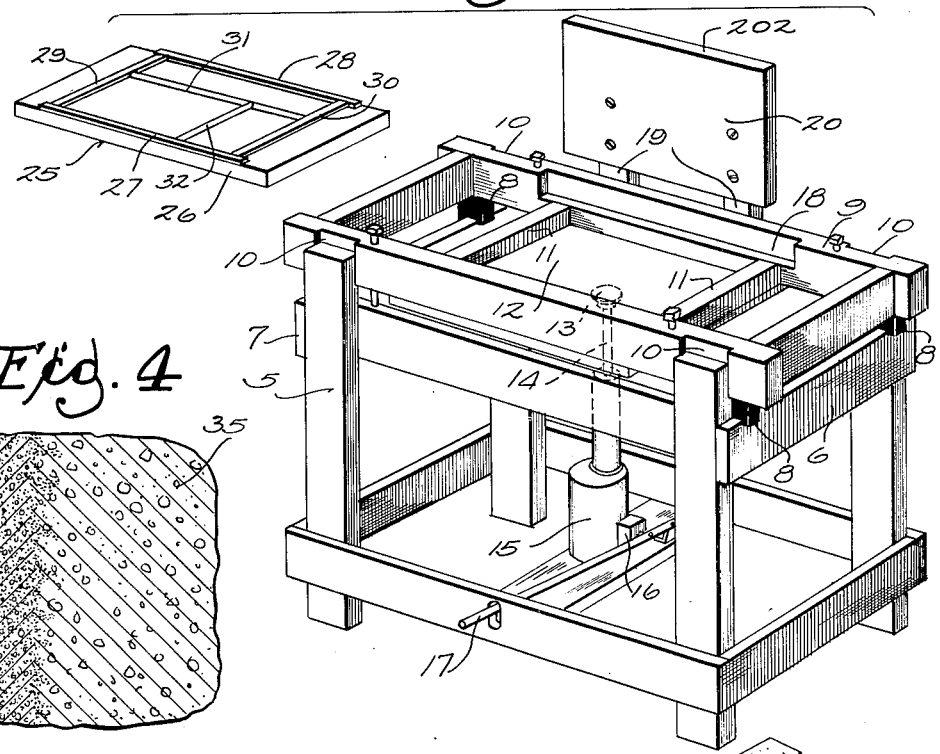
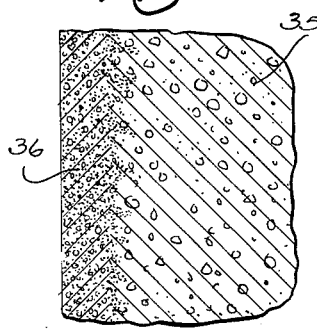
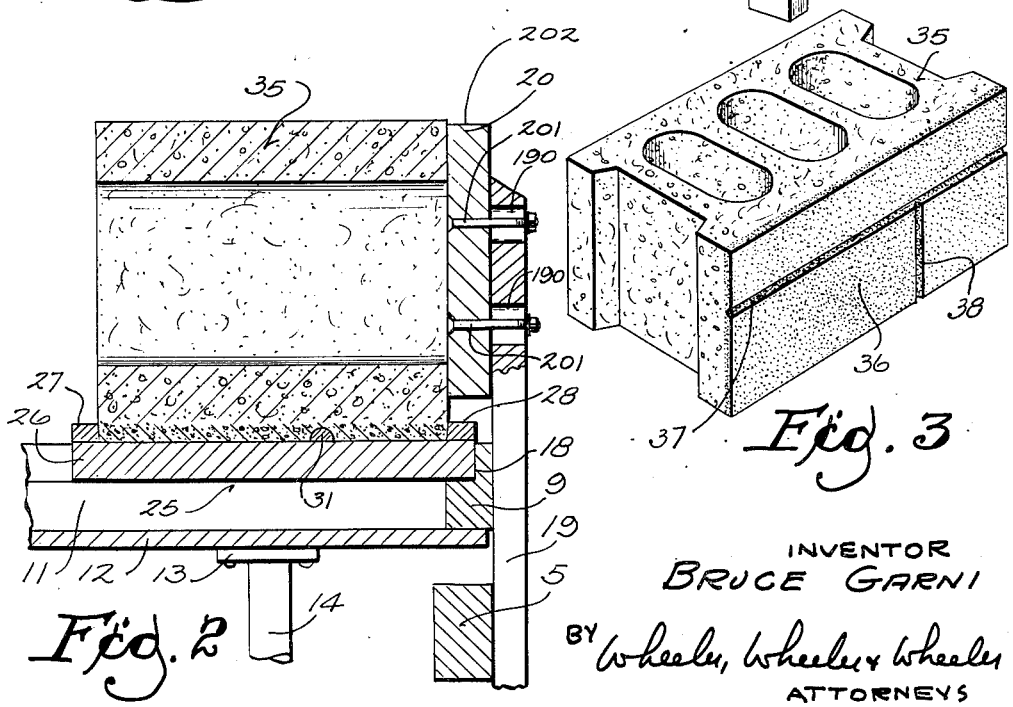
INVENTOR
BRUCE GARNI
BY Wheeler, Wheeler & Wheeler
ATTORNEYS

United States Patent Office 2,700,810
Patented Feb. 1, 1955

2,700,810

APPARATUS FOR MANUFACTURING FACED CONCRETE BLOCKS

Bruce Garni, Milwaukee, Wis.

Application February 10, 1948, Serial No. 7,347

2 Claims. (Cl. 25—41)

This invention relates to improvements in an apparatus for manufacturing faced concrete blocks.

In the past, where a concrete block with a special face was desired, it has been the practice to introduce a special mix of facing material into the mold, and then immediately to introduce into the mold the mix of which the remainder of the block is composed. In other words, the facing mix and the mix for the bulk of the block were both introduced into the same mold at substantially the same time. This makes it difficult to introduce any variation as between different blocks. In the use of natural stone, one stone may be quite different in color and texture from an adjacent stone.

Another difficulty involved in the prior art method is attributable to the fact that the face of the block which is specially finished is ordinarily a face at one side of the cores which form the openings in the blocks. Since the special mix must necessarily be introduced into the bottom of the mold, this requires that the cores enter through the side. There is no particular objection except that if the mold is to be dismantled immediately, it is necessary to use more concrete and make a heavier block where the core enters from the side than would be required if the core entered from the top. The wet mix will collapse more readily when the core is withdrawn laterally than is the case where the core is withdrawn vertically. Thus, the molds used are tied up longer to await the setting of the mix where the core is withdrawn laterally than where the core is withdrawn vertically.

The present invention meets all of these objections by providing a way in which the body of the block may be made independently of the face and may be faced after curing or at least after setting sufficiently to be handled. This enables me to manufacture the block bodies in quantity and store them until needed, using, in the manufacture of the rough body, molds having vertical cores which may be withdrawn almost immediately after molding, thereby reducing the number of molds required. Thereafter, I provide a special pallet in the form of a shallow pan into which I introduce the special facing mix in such colors or combinations of colors as may be desired. On this pan filled with the special facing mix, I deposit the preformed rough block and subject the assembly to vibration. The vibration brings the moisture to the surface of the facing mix, and the thin grout thus brought to the surface of the facing mix will penetrate the pores of the pre-formed body to effect a perfect bond under pressure of the weight of such body.

Apparatus for the practice of the invention is shown in the drawings.

In the drawings:

Fig. 1 is a view in perspective showing a special vibrating table designed for the practice of the present invention, the pan-shaped pallet which is a feature of the invention being separately illustrated en route to the table.

Fig. 2 is an enlarged detail view in fragmentary cross section through a portion of the vibrating table.

Fig. 3 is a view in perspective of a finished block embodying the invention.

Fig. 4 is an enlarged fragmentary detail view in cross section through a portion of such a block and its facing.

The table comprises a frame 5 having cross members 6 and 7 provided with resilient supports which preferably take the form of the elastic cushions 8 for a sub-frame 9 confined between the table legs and notched at 10 to receive the front legs for guidance in the course of the vertical reciprocation of the sub-frame. In the course of such reciprocation, the sub-frame 9 moves freely upon the bolts 50 which are mounted in the main frame 5, the extent of reciprocation being limited by the heads of the bolts 50, which thereby maintain the parts in unitary assembly.

The sub-frame is provided intermediate its ends with cross bars 11 connected by a plate 12 to which is attached the head 13 of the operating rod 14 of a vibrating motor 15. As shown, the motor is electrical and is provided with a switch at 16 controlled by foot pedal 17.

The cross members 11 receive and support the pallet hereinafter described. Registering with them is a notch at 18 in the back of the sub-frame for positioning the pallet. Carried from the rear of frame 5 behind the sub-frame 9 by uprights 19 is a guide board 20 for the block which is to be faced.

The pallet 25 takes the form of a shallow pan made either of wood, or of metal. As shown, the pallet includes a board 26, and the pan is formed by strips 27, 28, 29 and 30 comprising the sides and ends of the rectangular pan based on such board. In addition, I may use ribs 31, 32 applied to the board within the rectangular outline of the strips constituting the sides of the pan. The strips 27, 28, 29 and 30 are preferably marginally bevelled as best shown in Fig. 2, and the marking strips 31 and 32 may be of any desired cross section as, for example, the half round section shown in Fig. 2.

The manner in which the method is practiced in the use of the disclosed apparatus is as follows:

In the shallow pan-shaped pallet I place a cementitious mix which preferably includes finely divided particles of the desired facing material. For example, the mix may comprise granite chips if the finished block is to appear to be a block of granite. Any suitable proportions may be used. A typical facing mix includes four parts by volume of granite chips or the like, one part by volume of cement, and three and one-half gallons of water to every one bag of the cement. The pan is filled to the level of its sides with this mix. For blocks with greater or less absorption, the ratio of water is increased or decreased. Other variations are made as dictated by skill and experience.

The pallet is then placed on the sub-frame of the vibrating table with its rear corners engaged in the notch 18, and its weight supported on the cross members 11. It will be noted that the spacing between the side and end walls of the pan-shaped pallet corresponds substantially identically with the outline of the block 35 which is to be faced.

With the pallet accurately positioned on the sub-frame, the block 35 previously cast of cinder concrete, or ordinary concrete, or any other desired mix, is carefully disposed in registry with the pan-shaped pallet between the side walls thereof as shown in Fig. 2. This operation is facilitated by the guide board 20 against which the rear face of the block will abut when the block is properly located. The vibrating motor 15 is then operated to vibrate the sub-frame, and the pallet, and the facing mix and block. In consequence of the vibration, a portion of the liquid in the facing mix, together with a portion of the cement, will penetrate the face of the pre-formed block 35, and the block will very slightly enter the pan-shaped pallet to the extent to which the said portions of the facing mix are displaced therefrom. The taper of the side walls of the pan and the fit of the pre-formed block thereto preclude the escape of any substantial part of the facing mix under the weight of the block during the vibrating operation. In effect, the block acts like a piston, biased by its own weight and inertia, to enter the very shallow cylinder represented by the pan-shaped pallet. This action, plus capillarity, accounts for the penetration of the portion of the block.

The bolts 301 which connect the guide board 20 with the vertical arms 19 are preferably disposed in the slots 190 of such arms to provide for a limited vertical adjustment of the board so that its top edge 202 will serve as a gauge. While any other gauge might be provided, it will be apparent that as the block enters the pallet as above described, the registration of the top surface of the block with the gauge margin 202 of the guide board 20 is a convenient means of indicating to the operator that the penetration of the mix into the block is sufficiently complete, and the vibration of the motor may be arrested.

Fig. 4 is a fragmentary cross section through the finished product. Although the facing 36 may have quite a different character structurally from the rough block 35, there is no sharp line of demarcation between the one and the other. They are thoroughly bonded, the material of the facing having entered the material of the block. If it is not desired to imitate natural stonework, the artificial joint lines formed at 37, 38 by the ribs 31, 32 of the pallet may be omitted by simply using a pallet without such ribs.

As above indicated, the bonding between the facing mix and the pre-formed block will be perfect notwithstanding the fact that the block may have been thoroughly cured. Of course, the bonding is less of a problem where the block 35 is freshly made immediately preceding the facing operation.

While a variety of changes in the method and apparatus may be made within the scope of the invention, the device and procedure as above described have proved very satisfactory and are the best known to me.

I claim:

1. Apparatus for facing pre-formed concrete blocks comprising a shallow pan which constitutes a portable supporting pallet for the handling of the freshly faced block, said pan having side walls conforming to the outline of the pre-formed block to be faced and serving as a container for the facing mix and a cylinder for confining such mix under pressure of the block to be faced, in further combination with a vibrating table having a subframe provided with a pallet locating means comprising a portion of the subframe cut out to accommodate the pallet and with a vibrating motor, and a block guide extending upwardly from the table at one side of the pallet locating means for positioning a block placed on said pallet.

2. In combination, a vibrating table having a frame, a sub-frame comprising side members and bottom members guided for vibration, and a vibrating motor connected with the sub-frame for the vibration thereof, of a pallet removably disposed between the subframe side member and upon the bottom members, the sub-frame being provided with pallet locating means, the pallet comprising a shallow pan adapted to receive a facing mix, the sub-frame being normally resiliently supported on the frame out of jarring contact with the frame during vibratory movement of the sub-frame.

References Cited in the file of this patent

UNITED STATES PATENTS

| Number | Name | Date |
|---|---|---|
| 719,244 | Mooney | Jan. 27, 1903 |
| 909,792 | Henderson | Jan. 12, 1909 |
| 1,004,327 | Williams | Sept. 26, 1911 |
| 1,162,172 | Jones | Nov. 30, 1915 |
| 1,493,732 | Camp | May 13, 1924 |
| 1,595,255 | Smith | Aug. 10, 1926 |
| 1,667,296 | Stine | Apr. 24, 1928 |
| 1,717,996 | Moore | June 18, 1929 |
| 1,719,989 | Moore | July 9, 1929 |
| 1,847,557 | Gerderes | Mar. 1, 1932 |
| 2,101,992 | Fish | Dec. 14, 1937 |
| 2,266,510 | Pottinger | Dec. 16, 1941 |